Patented Aug. 25, 1953

2,650,235

UNITED STATES PATENT OFFICE 2,650,235

NEW PHTHALIDE COMPOUNDS AND THEIR PREPARATION

James H. Boothe, Montvale, N. J., and Joseph P. Petisi, Tappan, N. Y., assignors to American Cyanamid Company, New York, N. Y., a corporation of Maine No Drawing. Application June 5, 1952,
Serial No. 291,990

8 Claims. (Cl. 260—343.3)

This invention relates to a new class of phthalide compounds and methods of preparing the same. More particularly this invention relates to the 3-[7-(lower alkoxy)-3-methyl-phthalidyl]succinic acids and the simple derivative thereof.

The new 3-[7-(lower alkoxy)-3-methylphthalidyl]succinic acids of this invention can be represented by the following structural formula:

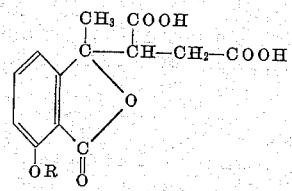

in which R represents a lower alkyl radical. The new acids contain two carboxyl groups and form esters in a manner typical of dicarboxylic acids. For instance, the new compounds can be isolated in the form of their mono-esters as illustrated by the mono-methyl or mono-benzyl esters or they can be isolated in the form of their di-esters as illustrated by the dimethyl or dibenzyl esters. Of course, the new acids undergo other typical reactions of carboxylic acids and can, for instance, be prepared and isolated in the form of metal salts or salts with organic bases. It will also be seen from the above formula that the new dicarboxylic acids of this invention have two carboxyl groups separated by a chain of two carbon atoms and typical of such dicarboxylic acids, the new dicarboxylic acids of this invention readily form cyclic anhydrides under anhydrous conditions. Since the esters, salts and anhydrides of the new acids of this invention are readily prepared by procedures analogous to those well known by one skilled in the art to be suitable for the preparation of such derivatives from other carboxylic acids, it is intended that such simple derivatives of the new dicarboxylic acids also constitute a part of the present invention.

The new compounds of this invention are crystalline solids useful in several fields of organic chemistry. For instance the new compounds, when in the form of the anhydrides, are useful as resin intermediates and can be reacted with a polyhydric alcohol, such as glycerol, to form useful synthetic resins. The new compounds are also useful intermediates in the preparation of fungicides by the procedure disclosed in copending U. S. application S. N. 286,034, filed May 3, 1952, by Samuel Kushner et al.

A novel method of preparing the new compounds of this invention has also been discovered and it is intended that this new method constitute a part of the present invention. According to the new method of this invention a triester of an alpha-carboxy-alpha-[3-(7-alkoxy-3-methylphthalidyl)]succinic acid is heated at a temperature of from about 80° C. to 150° C. in aqueous solution with a non-oxidizing mineral acid. This results in the hydrolysis of the triester compound and decarboxylation to give the corresponding 3-(7-alkoxy-3-methyl-phthalidyl)succinic acid. This new reaction may be illustrated by the following equation:

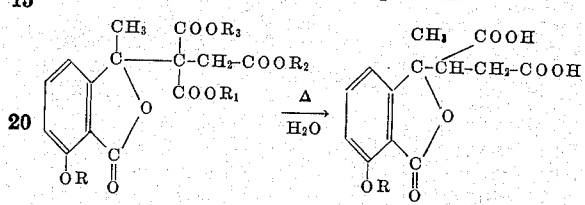

in which R represents a lower alkyl group and $R_1$, $R_2$, and $R_3$ represent esterifying radicals.

Practically any available triester of the alpha-carboxy-alpha-[3-(7-alkoxy-3-methyl-phthalidyl)]succinic acid compound is satisfactory since the ester groups are removed by hydrolysis during the reaction and their original nature is more or less immaterial. As illustrative examples, one can employ any of the lower alkyl esters, for instance the trimethyl ester, triethyl ester or tri-isopropyl ester, or one can employ the arylalkyl esters, for instance the tribenzyl ester.

It is an advantage of the new process of this invention that the hydrolysis can be performed with practically any of the common nonoxidizing mineral acids, for instance hydrochloric, sulfuric and phosphoric. Hydrobromic acid and hydroiodic acid can be employed, although the use of these acids is usually not advantageous since it can result in the hydrolysis of the alkoxy group on the phthalide nucleus. While the function of the mineral acid is primarily that of a hydrolyzing agent or, in other words, a catalyst, it has been found that more satisfactory results are obtained if the mineral acid is employed in reasonably strong concentrations. For instance with hydrochloric acid, best results are usually obtained if sufficient acid is employed to give a 5N to 12N solution and with sulfuric or phosphoric acid, best results are usually obtained if sufficient acid is employed to give a 5N to 18N solution. The preferred mineral acid is hydrochloric acid employed in quantities sufficient to give an 8N to 10N solution.

It is also an advantage of the new process of this invention that it can be performed within a relatively wide range of temperatures, for instance from about 80° C. to about 150° C. Temperatures of from about 100° C. to about the reflux temperature of the reaction mixture are preferred since the reaction is accelerated by high temperatures. Of course, the reaction can be conducted under pressure if desired but the faster reaction obtained at temperatures above the reflux temperature is often not worth the added inconvenience. In the presence of 8N to 10N hydrochloric acid at about 100° C., the reaction is substantially complete in about twenty-four hours, and at the reflux temperature of the reaction mixture the reaction is substantially complete in about eight to fifteen hours.

The invention will be more particularly illustrated by the following example in which all parts are by weight unless otherwise indicated.

EXAMPLE

*Preparation of 3-(7-methoxy-3-methylphthalidyl) succinic acid*

Some 6 parts by weight of the triethyl ester of alpha - carboxy-alpha-[3-(7-methoxy-3-methyl - phthalidyl)]succinic acid, prepared by the procedure of copending U. S. application S. N. 291,989, filed concurrently herewith, are refluxed for fifteen hours in 12 parts by volume of concentrated hydrochloric acid. The resulting solution is cooled, diluted with 20 parts by volume of water, and extracted three times with 40–50 parts by volume portions of ethyl acetate. The ethyl acetate extracts are combined, dried by treatment with anhydrous magnesium sulfate, and then evaporated to dryness. The residual solids are boiled with 20 parts by volume of ethyl acetate, causing some, but not all of the solids to dissolve.

The insoluble portion is filtered from the hot ethyl acetate solution and recrystallized from water. The purified material is primarily the higher melting of the two possible dl racemic mixtures of 3-(7-methoxy-3-methylphthalidyl) succinic acid.

The hot ethyl acetate filtrate from the above filtration is cooled, and another product crystallized from solution. This material is primarily the lower melting dl racemic mixture of 3-(7-methoxy-3-methylphthalidyl) succinic acid.

Other 3 - [7 - (lower alkoxy)-3-methylphthalidyl)] succinic acids are prepared by the same procedure as above. For instance, to prepare 3-(7-ethoxy-3-methylphthalidyl) succinic acid one need only substitute an equal molar quantity of the triethyl ester of alpha-carboxy-alpha-[3-(7-ethoxy-3-methylphthalidyl)]succinic acid for the alpha - carboxy-alpha-[3-(7-methoxy-3-methyl - phthalidyl)]-succinic acid ester employed above.

Also, one need not employ the triethyl ester as was done in the above example, but can substitute an equal molar quantity of other esters, for instance the trimethyl ester of alpha-carboxy-alpha-[3-(7-methoxy-3-methylphthalidyl)] succinic acid.

We claim:

1. Compounds selected from the group consisting of the 3-[7-(lower alkoxy)-3-methylphthalidyl]succinic acids, and the simple esters, salts and cyclic anhydrides of said acids.

2. The new compound 3-(7-methoxy-3-methylphthalidyl) succinic acid.

3. The new compound 3-(7-ethoxy-3-methylphthalidyl) succinic acid.

4. The method of preparing compounds selected from thet group consisting of the 3-[7-(lower alkoxy) - 3 - methylphthalidyl] - succinic acids, and the simple esters, salts and cyclic anhydrides of said acids, which comprises heating a triester of an alpha-carboxy-alpha-(3-[7-(lower alkoxy)-3-methylphthalidyl])succinic acid said heating being performed in aqueous solution, at a temperature of from about 80° C. to about 150° C., and in the presence of a nonoxidizing mineral acid.

5. The method of claim 4 wherein said mineral acid is hydrochloric acid employed in a quantity sufficient to give a 5N to 12N solution.

6. The method of claim 4 wherein said mineral acid is sulfuric acid employed in a quantity sufficient to give a 5N to 18N solution.

7. The method of preparing the 3-[7-(lower alkoxy)-3-methylphthalidyl]succinic acids which comprise heating at a temperature of about the reflux temperature of the reaction mixture for at least about eight hours, a triester of an alpha-carboxy - alpha - (3-[7-(lower alkoxy)-3-methylphthalidyl])succinic acid, said heating being performed in aqueous solution in the presence of a quantity of hydrochloric acid sufficient to give an 8N to 10N solution.

8. The method of claim 7 wherein said triester is the triethyl ester.

JAMES H. BOOTHE.
JOSEPH P. PETISI.

No references cited.